United States Patent [19]

Behrens

[11] Patent Number: 4,612,820

[45] Date of Patent: Sep. 23, 1986

[54] AUTOMATIC TRANSMISSION SHIFT SELECTOR MECHANISM

[75] Inventor: William L. Behrens, Madison Heights, Mich.

[73] Assignee: Chrysler Corporation, Highland Park, Mich.

[21] Appl. No.: 740,704

[22] Filed: Jun. 3, 1985

[51] Int. Cl.[4] .............................................. G05G 5/06
[52] U.S. Cl. .................................. 74/475; 74/473 R; 74/476
[58] Field of Search ..................... 74/473 R, 475, 476

[56] References Cited

U.S. PATENT DOCUMENTS 2,917,941  12/1959  Wittren ............................ 74/473 R
3,998,109  12/1976  O'Brien ................................. 74/475
4,398,433   8/1983  Sonns .................................... 74/475

*Primary Examiner*—Allan D. Herrmann
*Attorney, Agent, or Firm*—Edward P. Barthel

[57] ABSTRACT

A shift lever mechanism for use with a vehicle automatic transmission. A pivoting lever supports an upwardly spring biased plunger for fore and aft travel in a detent slot. The detent slot is formed in a cylindrical plate portion formed substantially concentric with the transverse pivot axis of the lever. The plunger is made from plastic material and is formed with a pair of transverse wall portions each having a plurality of mirror image step-up blocks. The slot includes a series of interconnected notches having progressively decreasing widths in both its fore and aft directions from a central dual mode notch. The notches define locating edges which successively contact and position the upwardly biased plunger step-up blocks during either fore or aft travel from the central notch to define a plurality of modes for the transmission.

6 Claims, 8 Drawing Figures

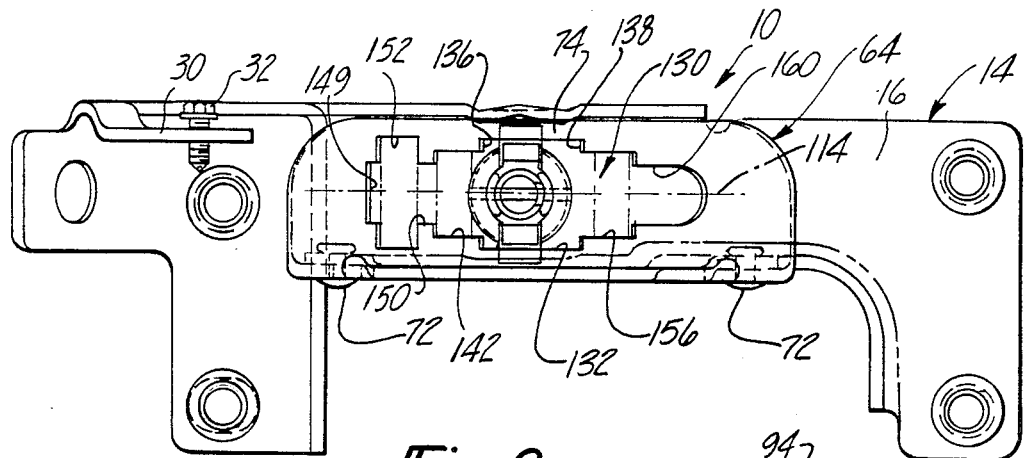
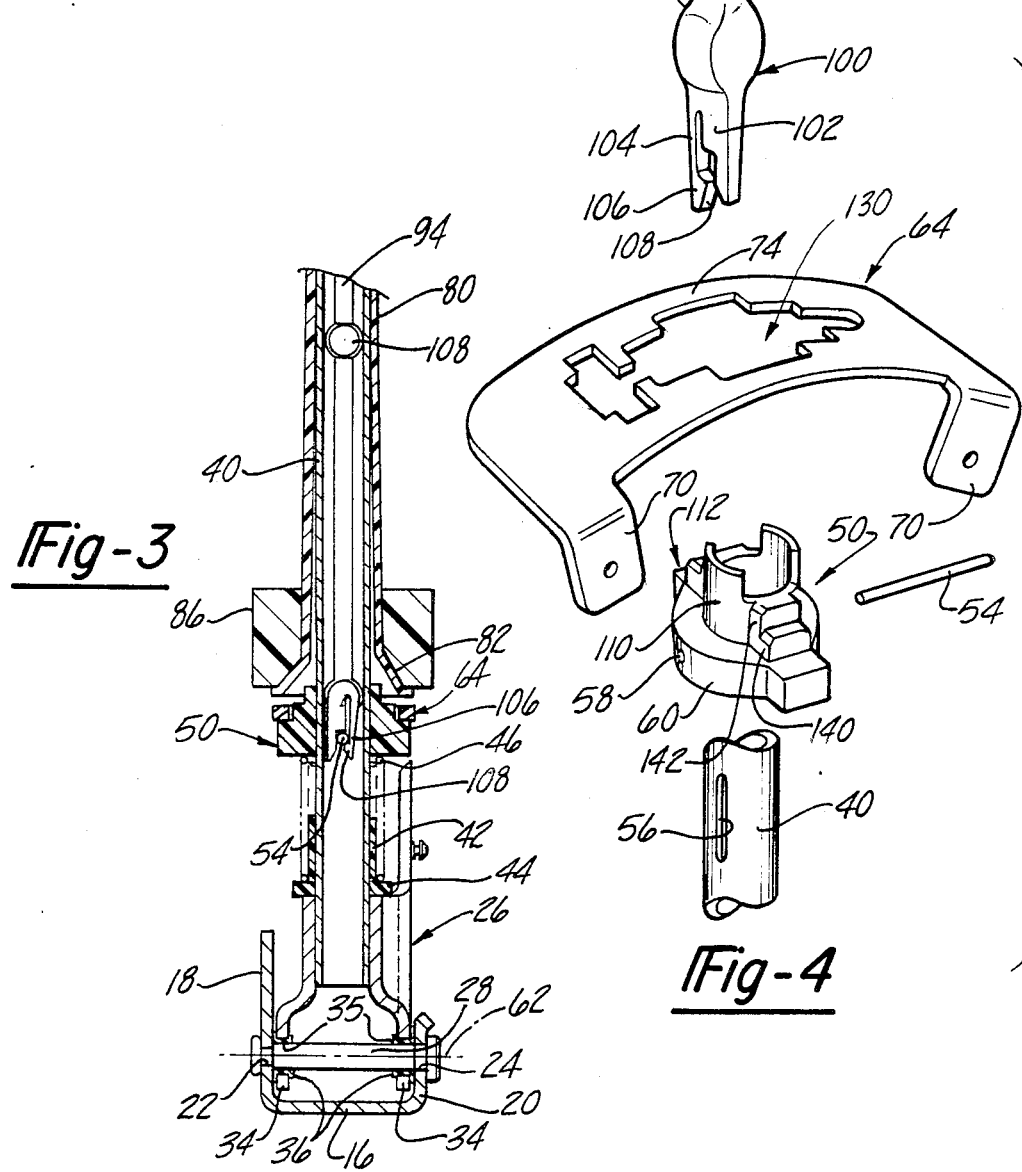

AUTOMATIC TRANSMISSION SHIFT SELECTOR MECHANISM

BACKGROUND OF THE INVENTION

The present invention relates to a transmission shift control lever, and more particularly to a shift control lever with a selector detent mechanism.

Several different shift selector mechanisms for an automatic transmission are known having six positions, i.e., "P" park, "R" reverse, "N" neutral, "D" drive, "2" second, and "1" low. An example of such selector is found in U.S. Pat. No. 2,917,941 to Writtren which discloses a shift selector detent having a generally cylindrical shape which is slidable and spring loaded on a shift lever. The Writtren selector is intended for a panel having a plurality of fore-and-aft slots interconnected by a transverse cross-over slot. Also, the Writtren selector requires a separate plate journaled on the shift lever positioned below the panel. This plate affords the operator a requisite amount of "feel" to determine when he is moving into and out of the reverse phase of the shift pattern.

The U.S. Pat. No. 3,998,109 to O'Brien is an example of typical automatic transmission shift control assembly having a simple longitudinal slot for pivotal movement of a shift lever. Although such prior art shifters function satisfactorily, there is a demand for a simple shifter which has a minimum number of parts and which can be manufactured economically.

BRIEF SUMMARY OF THE INVENTION

It is a feature of the present invention to provide a shift selector mechanism which has an improved detent feeling together with a positive detent positioning means. Another feature of the present invention is to provide an improved shift selector mechanism which is compact in size while operating in a smooth, noiseless manner.

According to the present invention, there is provided a shifter lever selector detent mechanism for a vehicle automatic transmission comprising a stepped plastic detent plunger. The plunger has transversely extending stepped blocks with parallel tread surface adapted to be successively spring biased into sliding contact with an arcuate undersurface of a sector plate. A longitudinally extending slot is formed in the sector plate including a series of interconnected notches having progressively decreasing widths in both fore and aft directions from a central notch defining a plurality of paired transverse locator edges. As the shift lever swings the stepped detent plunger within the slot in a reverse arcuate path from the central notch position the locator edges are adapted to successively engage and retain the plunger in selected operating modes of the transmission.

The successive plunger operating modes are attained by spring biasing button means on the lever operative to bias the plunger toward the shift lever handle. As a result successive opposed pairs of stepped treads are brought into sliding engagement with the arcuate concave undersurface of the sector plate. In the disclosed form the plunger has a pair of side wall portions each defining three mirror image step-up blocks. Thus, upon the lever being moved in the reverse arcuate direction from its intermediate "neutral" central notch position, the plunger may be successively retained in three selected locations, defining drive, second speed, and low speed mode positions. This may be done by depressing the plunger once between drive and second speed and again between second speed and low speed. The plunger may be returned to the control notch by being successively biased out of the low speed mode position into the second speed mode position and thence into its drive or neutral central notch modes without the operator depressing the selection lever button. However, the operator will be able to "feel" or sense the change of modes by the plunger step-up block treads successively impacting on the sector plate concave undersurface during return travel of the lever to its central notch positions.

Upon the lever being moved in the forward direction from its neutral or drive central notch positions, the plunger may be depressed by the selector lever button and located in a reverse mode by means of a narrower notch corresponding to the width of the second speed notch. Further, depression of the plunger will allow the operator to move the lever forward past a locking notch and into a park mode notch at the forward end of the detent slot. The locking notch has a width equal to that of the low speed notch while the park mode notch has a width corresponding to the drive and neutral mode notch. Thus, the plunger must be depressed by the selector lever button to move the lever rearwardly out of the locked park mode. That is the mechanism requires a positive unlocking of the plunger by the operator prior to the shift lever being moved rearwardly to its reverse, neutral and drive modes.

BRIEF DESCRIPTION OF THE DRAWINGS

Other features and advantages of the present invention will become apparent from the following description when taken in conjunction with the accompanying drawings, in which:

FIG. 2 is a top elevation view of the mechanism of FIG. 1 with the lever and operating handle removed;

FIG. 3 is a fragmentary vertical sectional view taken substantially on line 3—3 of FIG. 1;

FIG. 4 is an enlarged fragmentary exploded view of the shift selector mechanism;

DETAILED DESCRIPTION OF THE PREFERRED EMBODIMENT

Figure 1:
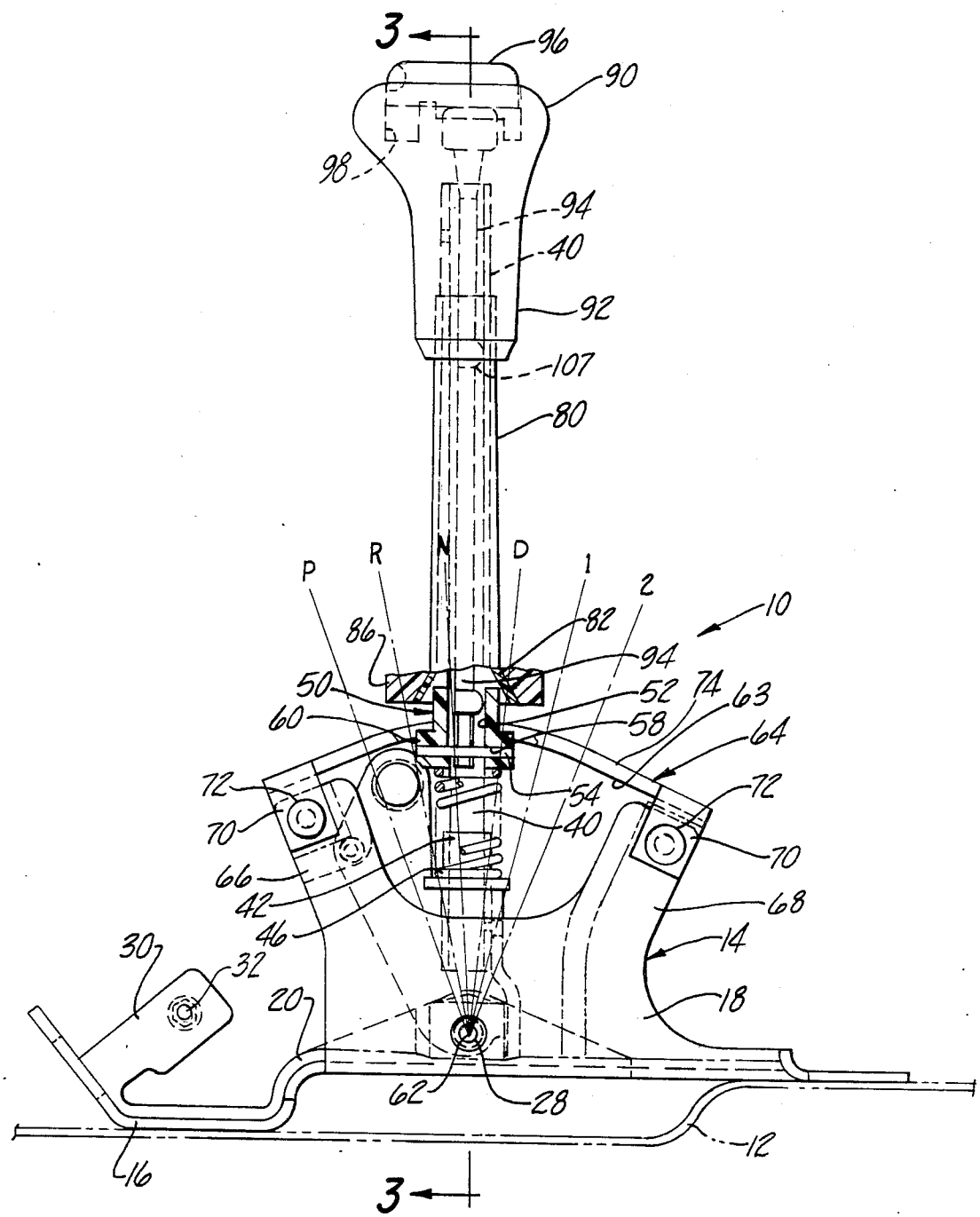
FIG. 1 is a side elevation view, with parts broken away showing the shift selector mechanism with parts in section.

Referring to FIGS. 1 and 2, the cable shifter, generally indicated at 10, is mounted on a vehicle floor 12 by frame means. In the illustrated embodiment the frame means includes a lever bracket 14 having an off-set base plate 16 with two parallel upstanding left and right side portions 18 and 20, respectively suitably formed as by stamping. The side portions 18 and 20 each have holes 22 and 24, respectively (FIG. 3) to pivotally mount lever assembly 26 by means of a transverse rivet pin 28. The base plate 16 also includes an upstanding flange portion 30 with a threaded screw 32 extending therefrom for attachment of an indicator cable (not shown).

Figure 5:
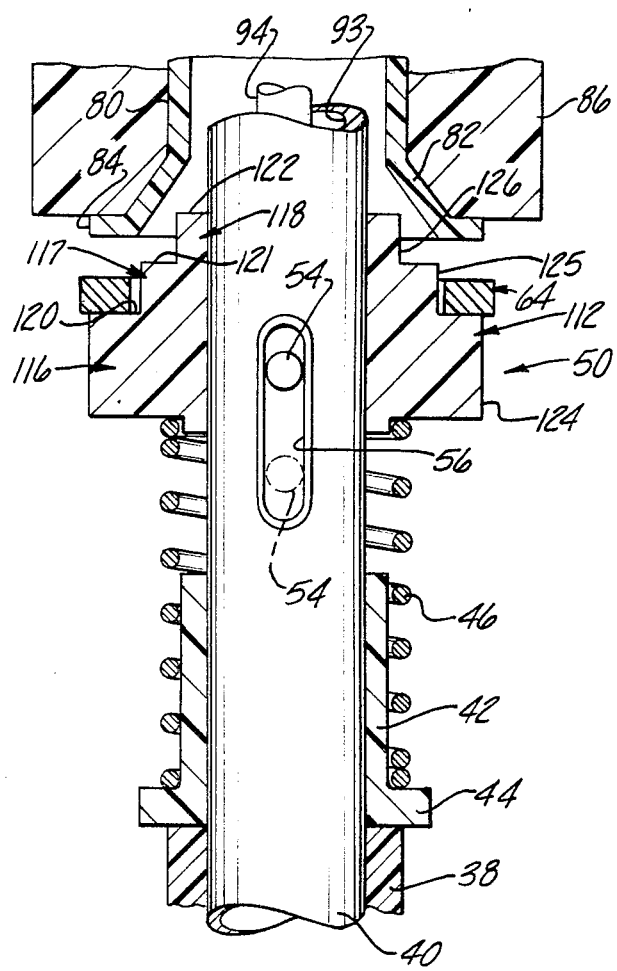
FIG. 5 is an enlarged fragmentary elevational view, of the plunger and lever portion of FIG. 3 with parts broken away.

The lever assembly 26 has lower forked trunnion flanges 34 pivotally mounted by means of their aligned holes 35 on the transverse pin journally received in plastic bearings 36. An upstanding U-shaped annular socket portion 38 of the lever assembly is adapted to receive the lower end of a tubular round-sectioned selector lever member 40 which is suitably secured thereto as by welding. As best seen in FIGS. 1 and 5 a plastic hat-shaped grommet 42 is concentrically positioned around the lower end of the lever member 40 having an annular flange 44 seated on the upper edge of the U-shaped socket portion 38. A compression coil spring 46 encircles the grommet 42 and is retained in compression between the annular flange 44 and a detent plunger generally indicated at 50, formed from a suitable plastic material such as polyurethane.

Figure 7:
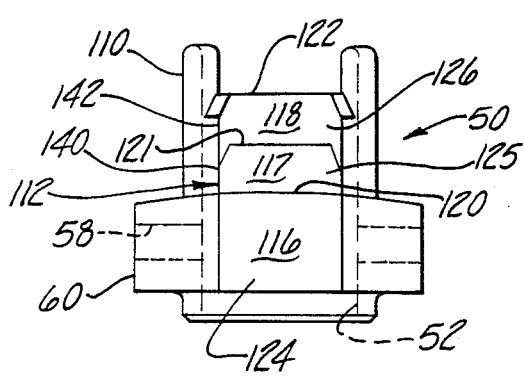
FIG. 7 is an enlarged side elevational detail view of the plunger.

The detent plunger 50 has an axial bore 52 sized to slidably receive the lever member 40 therethrough. As seen in FIG. 1 a longitudinally disposed plunger pin 54 extends diametrically through aligned slots 56 in the lever member 40 and longitudinal bore 58 in annular base pedestal 60 of the plunger member 50. The exploded view of FIG. 4 and enlarged FIG. 7 shows a pair of elongated diametrically opposed guide slots 56 axially extending in the lever member 40 receiving the respective ends of the cross pin 54 therein. The slots 56 are of a predetermined length sufficient to allow free reciprocal movement of the plunger 50 its pin 54 during arcuate travel of the plunger with the lever 40 about transverse pivot axis 62 of the rivet pin 28.

As seen in FIGS. 1 and 2, the spring 46 biases stepped tread portions of the plunger member 50 into sliding or tracking contact with concave undersurface 63 of arcuate sector plate member 64. The plate 64 is preferably made from sheet metal and is secured to a pair of diverging fore and aft legs 66 and 68 respectively of the bracket side portion 18. FIG. 4 shows the sector plate member 64 provided with a pair of right angle tabs 70 struck from opposite ends thereof. The tabs 70 are secured to respective ones of fore and aft legs 66, 68 by rivets 72. As best seen in FIG. 1 the sector plate 64 is positioned such that it's central cylindrical portion 74 defines an arc of a circle having its center of curvature located on the transverse pivot axis 62 of rivet pin 28.

The intermediate portion of the lever member 40 is encircled by an outer tubular sheath 80 preferably molded from suitable plastic material. The sheath 80 lower end is formed with a diverging cone-shaped portion 82 terminating in a radial lip 84 which supports an annular seal member 86 preferably made of a foam-like plastic material. The upper end of the lever member 40 has a palm-abutting knob 90 secured thereon preferably formed from plastic material having an integral tubular collar 92 surrounding the upper end of the sheath 80 and suitably fixed thereto.

Within hollow 93 of the tubular lever member 40 is disposed an elongated push rod 94 which is axially movable. As seen in FIG. 1 the top of rod 94 is fixed to a operating member or button 96 which protrudes from a central cavity 98 in the knob 90. As best seen in FIG. 3 the lower end of the rod 94 has releasable cross pin attachment means, generally indicated at 100. The attachment means 100 is in the form of a bifurcated member including prongs 102 and 104 integrally moulded from a plastic material. The prong 104 has a snap portion 106 with an inclined surface 108 (FIG. 4) adapted to yieldably receive the cross pin 54 for capture between the prongs 102 and 104. The rod 94 has annular protrusions or spheres 108 molded thereon for guided axial travel within the lever member hollow 93. Thus, the compression spring 46 biases the plunger 50, plunger pin 54 and rod 94 in an axially direction toward the lever upper handle end as shown by the cross pin 54 neutral or drive location in FIG. 5.

Figure 6:
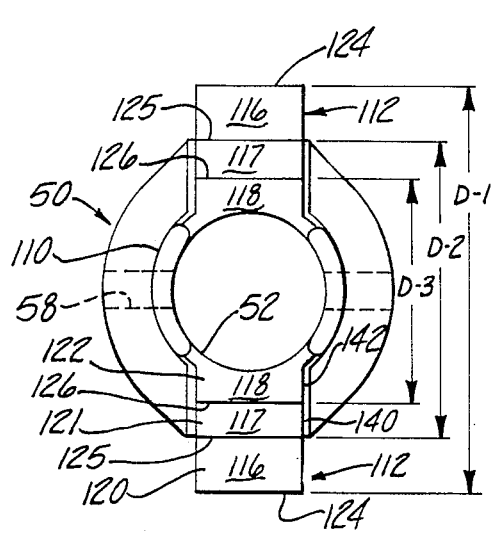
FIG. 6 is an enlarged top elevational detail view of the plunger.

As best seen in FIGS. 5, 6 and 7, the plunger member annular pedestal 60 is formed with an upstanding neck portion 110. The neck portion has a pair of transversely extending stepped wall portion 112, integrally molded on either side thereof. As the plunger member is symmetrical about a longitudinally extending vertical plane, defined by construction line 114, the same numerals will be used to designate like or corresponding portions of the plunger member 50.

Each wall portion 112 has three ascending step-up blocks 116, 117 and 118 which as seen in FIG. 7, have respective ascending surfaces or treads 120, 121 and 122 located in substantially parallel planes. Each block 116, 117 and 118 has a corresponding surface or riser 124, 125 and 126 respectively, each positioned in a longitudinally extending substantially vertical plane.

FIGS. 2 and 4 show the sector plate 64 provided with a longitudinally extending detent slot generally indicated at 130 also formed symmetrical about the vertical plane of construction line 114. The detent slot 130 has notched mirror image sides providing a series of rectangular shaped interconnected detent notches. A dual mode central notch, defined by slot longitudinal side portions 132, has a dimension W-1 (FIG. 8) a predetermined distance less than the dimension D-1 (FIG. 6) between the outermost block risers 124. Thus, the plunger treads 120 are maintained in spring biased contact with the concave undersurface 63 of the sector plate during the longitudinal travel of the plunger in the central intermediate notch 132 between its transverse fore and aft paired stop or locating edges 136 and 138, respectively. As seen in FIG. 1 when the lever 40 and plunger may be moved in a forward direction from the vertical position shown until transverse forward side surface 140 of step-up blocks 117 contact locating edges 136 positioning the selector lever 40 in its neutral mode indicated at "N" in FIG. 1. Upon the button 96 depressing the plunger 50 a first predetermined distance the forward facing side surfaces 140 of the intermediate step-up blocks 117 clear the detent slot locating edges 136. The shift selector arrangement allows the plunger 50 to be moved forward into the next adjacent notch 142 until transverse forward side surfaces 140 of the uppermost step-up blocks 118 contact stop edges 148. In this position the selector lever 40 places the transmission in its reverse mode indicated at "R" in FIGS. 1 and 8.

Upon the button 96 depressing the plunger 50 a second predetermined distance the pair of forward facing side surfaces 140 clear stop edges 148. A detent slot locking notch 150 is provided forward of the reverse mode notch 142 having a predetermined dimension W-3 slightly larger than the diameter of the neck portion 110. This arrangement allows the operator to move the neck portion 110 of the plunger 50 forwardly passing through the locking notch 150 and contacting transverse forward edge 149 of the detent slot. In this position, the plunger aligned with forwardmost notch 152. Thus, upon release of the button 96, the transmission is placed in its park mode indicated at "P" in FIGS. 1 and 8. In the park mode the spring 46 biases the plunger toward the lever handle end until the lowermost block treads 120 contact the sector plate undersurface 63. The arrangement provides a positive park mode lock for the plunger in the notch 152 shown in full lines in FIG. 8. To release the plunger from its park mode the button 96 must be depressed to locate the longitudinal pin 54 in its dashed line position of FIG. 5. In this depressed position the plunger uppermost step-up blocks 118 clear the locking notch 150 allowing the shift lever 40 to be moved rearwardly.

Figure 8:
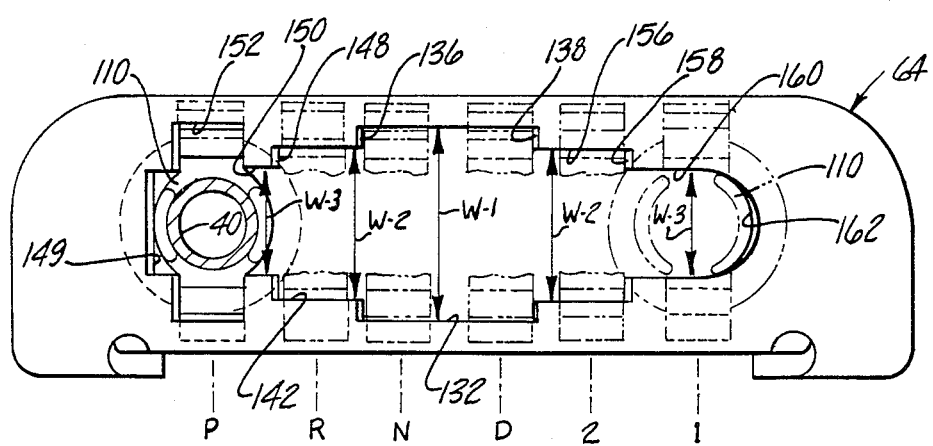
FIG. 8 is an enlarged fragmentary elevational view of the sector plate showing the detent plunger in its various operative locations.

Returning to the FIG. 1 plunger position, upon the lever being moved rearwardly without the button 96 depressing the plunger 50 rear facing side surfaces 140 of intermediate step-up blocks 117 contact stop edges 138 positioning the selector lever in its drive mode indicated at "D" in FIGS. 1 and 8. Upon the button 96 depressing the plunger 50 said first predetermined distance, the rearward facing side surfaces 140 of the intermediate step-up blocks 117 clear the drive mode locator edges 138. As a result the lever and plunger may be moved rearwardly in notch 156 until the rear facing side surfaces 142 of uppermost step-up blocks 118 contact stop edges 158 positioning the selector lever 40 in its second speed mode indicated at "2" in FIGS. 1 and 8.

Further, upon the operator depressing the plunger 50 said second predetermined distance, the rearward facing side surfaces 140 of the intermediate step-up blocks 117 clear the stop edges 158. As a result the lever and plunger may be moved rearwardly in low speed notch 160 until the plunger neck portion 110 contacts a conforming half-round terminal rearward edge 162 of the detent slot 130. The selector lever 40 is now positioned in its low speed mode indicated at "1" in FIGS. 1 and 8. It will be noted that the low speed notch 160 has a dimension W-3 substantially equal to the width of the locking notch 150.

A feature of the the selector mechanism is that it allows the operator to move the lever 40 forwardly from the low speed mode position "1" to the drive mode "D" or neutral mode "N" without depressing the button 96. In a like manner the mechanism allows the operator to move the selector lever rearwardly from the reverse mode "R" to the neutral mode "N" or drive mode "D" without the operator depressing the button 96. Further, because the plunger 50 is made of plastic material which is biased by spring 46 into frictional contact with the metal sector plate member the shift mechanism operates in a smooth noise or rattle-free manner throughout its travel between its various shift positions.

While one embodiment has been described, those skilled in the art will appreciate that other embodiments may be possible without departing from the scope of the following claims.

What is claimed is:

1. A shift lever mechanism for use with a vehicle automatic transmission comprising; support means, a selector lever provided with a handle end and a pivot end, said lever pivot end mounted on said support means for pivotal movement about a transverse pivot axis in a longitudinally extending vertical plane, an arcuate shaped sector plate fixed to said support means defining a cylindrical portion formed substantially concentric with said transverse pivot axis providing a convex upper surface and a concave undersurface, said sector plate having a longitudinally extending detent slot receiving said lever therethrough, said slot including a series of interconnected notches having progressively decreasing widths in both its fore and aft directions from a central maximum width notch, said central notch defining fore and aft paired transverse locator edges, and said fore and aft progressively decreasing width notches each defining associated transverse locator edges, a plunger supported on said lever for limited axial travel thereon, resilient means biasing said plunger axially toward said lever handle end, means on said handle end operative to move said plunger axially toward said lever pivot end, said plunger formed with a pair of wall portions extending transversely outwardly from said lever, each said wall portion forming a plurality of paired mirror image step-up blocks wherein each pair of blocks define riser and tread surfaces, each said wall portion pair of successive outermost and next outermost step-up blocks having a predetermined size in relation to said detent slot central notch and its next adjacent fore and aft notches, respectively, wherein said plunger being retained at a predetermined fore or aft location in said central notch by the next adjacent pair of step-up blocks engaging their associated fore and aft transverse central notch locator edges, with said outermost treads in resiliently biased contact with said sector plate concave undersurface, thereby defining a pair of transmission operating modes, and wherein upon said plunger being initially moved axially a predetermined distance toward said lever pivot end by said handle operating means said lever being free for subsequent longitudinal movement in either a fore or aft direction, such that the next adjacent pair of of step-up blocks clearing their associated central notch transverse locator edges, whereby said plunger being retained by virtue of the next succeeding notch transverse locator edges engaging the next adjacent pair of step-up blocks thereby defining an additional pair of fore and aft transmission operating modes and so forth.

2. The shift lever mechanism as set forth in claim 1, wherein said plunger made from plastic material and formed with an axial bore sized to slidably receive said lever therethrough, said lever in the form of a hollow tubular round sectioned member, said resilient means in the form of a compression coil spring surrounding said lever, said spring being retained between said support means and said plunger so as to exert a continual upward biasing force on said plunger.

3. The shift lever mechanism as set forth in claim 2 wherein, said lever having a pair of opposed axially extending slots, said plunger having a longitudinal bore extending therethrough aligned with said slots, a longitudinally disposed plunger pin extending through said longitudinal bore in said plunger, with said pin having its outer ends received in respective ones of said slots for axial travel therein.

4. The shift lever mechanism as set forth in claim 1, wherein the forwardmost notch of said slot having a width substantially equal to said central notch defining a "park" mode, and wherein said forwardmost notch being immediately proceeded by a locking notch having a predetermined width sized to allow passage therethrough of an upstanding neck portion of said plunger upon said plunger being initially moved axially a predetermine distance toward said lever pivot end by said handle operating means, whereby upon said plunger being aligned with said forwardmost notch release of said handle operating means causes said resilient biasing means to move said plunger toward said lever handle end such that said plunger is positively locked in said forwardmost notch.

5. A shift lever mechanism for use with a vehicle automatic transmission comprising: support means, a lever provided with a handle end and a pivot end, said lever pivot end mounted in said support means for pivotal movement about a transverse pivot axis in a longitudinally extending vertical plane, an arcuate shaped metal sector plate fixed to said support means defining a cylindrical portion formed substantially concentric with said transverse pivot axis providing a convex upper surface and a concave undersurface, said sector plate having a longitudinally extending detent slot receiving said lever therethrough, said slot including a series of interconnected notches having progressively decreasing widths in both a fore and aft direction from a central maximum width dual mode notch defining fore and aft paired transverse locator edges, a plunger formed from plastic material supported on said lever for axial travel thereon, resilient means biasing said plunger axially toward said lever handle end, operating means on said handle end operative to move said plunger axially toward said lever pivot end, said plunger formed with a pair of mirror image wall portions extending transversely from either side thereof, each said wall portion forming a plurality of paired mirror image step-up blocks wherein each pair of blocks defines vertical riser surfaces and horizontal tread surfaces, the outermost pair of corresponding risers spaced a first predetermined transverse distance slightly more than the width of said central notch, the next outermost pair of corresponding risers spaced a second predetermined transverse distance slightly less than said central notch maximum width and slightly more than the width of the next succeeding notch and so on, wherein said plunger being retained in said central notch by the next adjacent pair of step-up blocks engaging transverse paired fore and aft locator edges defined by said central notch and said next succeeding fore or aft notch, and with said outermost treads in resiliently biased contact with said sector plate concave undersurface, thereby defining an operating mode of said transmission, and wherein upon said plunger being initially moved axially a predetermined distance toward said lever pivot end by said handle operating means and subsequently moved longitudinally in either a fore or aft direction such that said next adjacent pair of step-up blocks clearing an associated pair of said central notch fore or aft locator edges, whereby said lever may be moved longitudinally causing said plunger to be retained by the next succeeding notch locator edges contacting the next adjacent pair of step-up blocks thereby defining a pair of additional fore and aft operating modes of the transmission.

6. The shaft lever mechanism as set forth in claim 5, wherein said sector plate detent slot comprising six notches including said central dual mode notch providing a forward neutral mode and a rearward drive speed mode, a pair of successive rearward notches providing a second speed mode and a low speed mode, a pair of forward notches providing a reverse mode and a pass-through locking notch, said locking notch having a transverse dimension equal to said low speed mode notch, and a forwardmost notch having a transverse dimension equal to said central notch providing a park mode operative to positively lock said plunger therein in cooperation with said locking notch.

* * * * *